US012627978B2

(12) United States Patent
Yu et al.

(10) Patent No.: US 12,627,978 B2
(45) Date of Patent: May 12, 2026

(54) METHOD AND APPARATUS FOR DETECTING COMMUNICATION DEVICE, COMMUNICATION DEVICE, AND STORAGE MEDIUM

(71) Applicant: Beijing Xiaomi Mobile Software Co., Ltd., Beijing (CN)

(72) Inventors: Lei Yu, Beijing (CN); Xiaolong Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 364 days.

(21) Appl. No.: 18/556,068

(22) PCT Filed: Apr. 19, 2021

(86) PCT No.: PCT/CN2021/088202
§ 371 (c)(1),
(2) Date: Oct. 18, 2023

(87) PCT Pub. No.: WO2022/222005
PCT Pub. Date: Oct. 27, 2022

(65) Prior Publication Data
US 2024/0388899 A1 Nov. 21, 2024

(51) Int. Cl.
*H04M 1/66* (2006.01)
*H04W 8/00* (2009.01)
(Continued)

(52) U.S. Cl.
CPC ......... *H04W 12/043* (2021.01); *H04W 8/005* (2013.01); *H04W 12/69* (2021.01)

(58) Field of Classification Search
CPC ............. H04W 12/043; H04W 12/106; H04W 12/108; H04W 12/69; H04W 8/005
See application file for complete search history.

(56) References Cited

U.S. PATENT DOCUMENTS

2015/0350897 A1* 12/2015 Du ........................ H04W 12/02
455/411
2016/0203086 A1 7/2016 Ng et al.
(Continued)

FOREIGN PATENT DOCUMENTS

CN 104243153 A 12/2014
CN 105165045 A 12/2015
(Continued)

OTHER PUBLICATIONS

MA Anjun, et al., "Combined Public Key Authentication System Based on Identity", Digital Communication, vol. 40, Issue No. 5, Oct. 25, 2013, 6 pages (English Abstract only).

*Primary Examiner* — Shantell L Heiber
(74) *Attorney, Agent, or Firm* — Volpe Koenig

(57) ABSTRACT

A communication device detection method includes: broadcasting first information by a first communication device, where the first information includes a first identifier (ID) associated with a second communication device and a public key of the first communication device; receiving second information; decrypting the second information by using a private key of the first communication device; and determining that the second communication device is detected in response to determining that the second information is successfully decrypted and a second ID included in the second information has a predetermined corresponding relation with the first ID.

19 Claims, 5 Drawing Sheets

(51) Int. Cl.
    *H04W 12/043*     (2021.01)
    *H04W 12/69*     (2021.01)

(56)              References Cited

U.S. PATENT DOCUMENTS

| | | |
|---|---|---|
| 2016/0323925 A1 | 11/2016 | Alanen et al. |
| 2017/0289155 A1 | 10/2017 | Kerai |
| 2019/0297495 A1* | 9/2019 | Aggarwal ............. H04L 9/3263 |
| 2020/0106877 A1 | 4/2020 | Ledvina et al. |

FOREIGN PATENT DOCUMENTS

| | | |
|---|---|---|
| CN | 105793724 A | 7/2016 |
| CN | 112205008 A | 1/2021 |
| CN | 112673339 A | 4/2021 |
| WO | 2021026696 A1 | 2/2021 |

\* cited by examiner

METHOD AND APPARATUS FOR DETECTING COMMUNICATION DEVICE, COMMUNICATION DEVICE, AND STORAGE MEDIUM

CROSS REFERENCE TO RELATED APPLICATION

The present application is a U.S. National Stage of International Application No. PCT/CN2021/088202, filed on PCT Apr. 19, 2021, the contents of all of which are incorporated herein by reference in their entireties for all purposes.

BACKGROUND

A distance between communication devices can be measured based on the time of flight (ToF) of a signal. A measurement signal is transmitted from a measurement device to a device to be measured, and received and returned by the device to be measured, and then the distance is measured by the measurement device based on the ToF.

SUMMARY

In view of this, examples of the disclosure provide a method and apparatus for detecting a communication device, a communication device, and a storage medium.

According to a first aspect of the example of the disclosure, a method for detecting a communication device is provided. The method is executed by a first communication device, and includes: broadcasting first information, where the first information includes a first identifier (ID) associated with a second communication device and a public key of the first communication device; receiving second information; decrypting the second information by using a private key of the first communication device; and determining that the second communication device is detected in response to determining that the second information is successfully decrypted and a second ID included in the second information has a predetermined corresponding relation with the first ID.

According to a second aspect of the example of the disclosure, a method for transmitting information is provided. The method is executed by a second communication device, and includes: receiving first information, and obtaining a first identifier (ID) and a public key of a first communication device that are included in the first information; and determining that the first ID and a second ID stored in the second communication device have a predetermined corresponding relation, and broadcasting second information, where the second information includes the second ID, and the second information is encrypted by using the public key of the first communication device.

According to a third aspect of the example of the disclosure, a communication device apparatus is provided. The apparatus includes a processor, a memory, and an executable program that is stored in the memory and runnable by the processor, where the processor executes steps of the method for detecting a communication device in the first aspect or steps of the method for transmitting information in the second aspect when running the executable program.

According to a fourth aspect of the example of the disclosure, a computer-readable storage medium is provided. The computer-readable storage medium stores an instruction, where the instruction implements the method in the first aspect or the second aspect when executed.

It should be understood that the above general description and the following detailed description are merely illustrative and explanatory, and cannot limit the example of the disclosure.

BRIEF DESCRIPTION OF THE DRAWINGS

The drawings here are incorporated into the description as a constituent part of the description, illustrate examples conforming to the disclosure, and serve to explain principles of the examples of the disclosure along with the description.

DETAILED DESCRIPTION

Examples will be described in detail here, and their instances are shown in accompanying drawings. When the following description involves the accompanying drawings, the same numerals in different accompanying drawings indicate the same or similar elements unless otherwise indicated. Embodiments described in the following examples do not represent all embodiments consistent with the examples of the disclosure. On the contrary, these embodiments are merely instances of apparatuses and methods that are detailed in the appended claims and consistent with some aspects of the examples of the disclosure.

Terms used in the examples of the disclosure are merely used for describing specific examples rather than limiting the examples of the disclosure. As used in the examples and the appended claims of the disclosure, the singular forms such as "a", "an", "the" and "this" are also intended to include plural forms, unless otherwise clearly stated in the context. It should also be understood that the term "and/or" used here refers to and includes any or all possible combinations of one or more associated listed items.

It should be understood that although terms such as first, second and third can be used in the examples of the disclosure to describe different kinds of information, the information should not be limited to these terms. These terms are merely used to distinguish the same type of information from each other. For example, first information can be referred to as second information, and similarly, second information can be referred to as first information, without departing from the scope of the examples of the disclosure. Depending on the context, the word "if" as used here can be interpreted as "at the time of" or "when" or "in response to determining".

In a cellular mobile communication system, a series of processes such as discovery and authorization are needed between two communication devices before distance measurement occurs. These processes consume plenty of time and signaling resources, and result in great pressure on the system when the system has enormous demand for distance measurement.

The disclosure relates to, but is not limited to, the technical field of radio communication, in particular to a method and apparatus for detecting a communication device, a communication device, and a storage medium.

Figure 1:
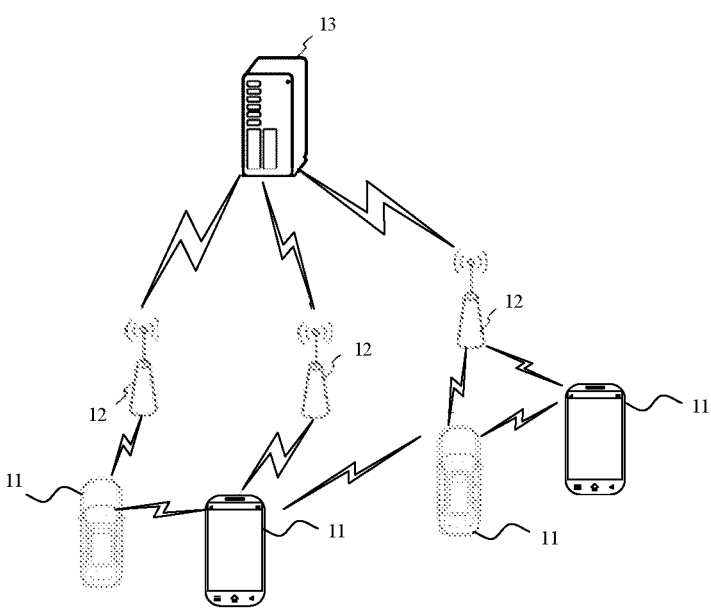
FIG. 1 is a schematic structural diagram of a radio communication system according to an example.

With reference to FIG. 1, a schematic structural diagram of a radio communication system according to an example of the disclosure is shown. As shown in FIG. 1, the radio communication system is a communication system based on cellular mobile communication technology. The radio communication system may include terminal(s) 11 and base station(s) 12.

The terminal 11 may be a device that provides voice and/or data connectivity for a user. The terminal 11 may communicate with one or more core networks via a radio access network (RAN). The terminal 11 may be an Internet of Things terminal, such as a sensor device, a mobile phone (or a "cellular" phone) and a computer with the Internet of Things terminal. For example, the terminal may be a fixed, portable, pocket-type, handheld, computer built-in or vehicle-mounted apparatus. For example, the terminal may be a station (STA), a subscriber unit, a subscriber station, a mobile station, a mobile, a remote station, an access point, a remote terminal, an access terminal, a user terminal, a user agent, a user device or user equipment (UE). Alternatively, the terminal 11 may also be a device of an unmanned aerial vehicle. Alternatively, the terminal 11 may be a vehicle-mounted device, for example, an electronic control unit having a radio communication function, or a radio communication device externally connected with an electronic control unit. Alternatively, the terminal 11 may also be a roadside device having a radio communication function, such as a street lamp, a signal lamp or other roadside devices.

The base station 12 may be a network-side device in a radio communication system. The radio communication system may be the 4$^{th}$ generation mobile communication (4G) system, also referred to as a long term evolution (LTE) system, or the radio communication system may be a 5G system, also referred to as a new radio (NR) system or a 5G NR system. Alternatively, the radio communication system may be a next generation system after the 5G system. An access network in the 5G system may be referred to as a new generation-radio access network (NG-RAN) or a machine-type communication (MTC) system.

The base station 12 may be an evolved base station (eNB) used in the 4G system. Alternatively, the base station 12 may be a base station (gNB) having a centralized distributed architecture in the 5G system. When in the centralized distributed architecture, the base station 12 usually includes a central unit (CU) and at least two distributed units (DU). Protocol stacks of a packet data convergence protocol (PDCP) layer, a radio link control (RLC) layer and a media access control (MAC) layer are arranged in the central unit. A physical (PHY) layer protocol stack is arranged in the distributed unit. A specific implementation mode of the base station 12 is not limited in the example of the disclosure.

A wireless connection may be established between the base station 12 and the terminal 11 through a radio. In different embodiments, the radio is a radio based on the fourth generation mobile communication network technology (4G) standard, or the radio is a radio based on the fifth generation mobile communication network technology (5G) standard, for example, the radio is new radio, or the radio may also be a radio based on the next generation mobile communication network technology standard after 5G.

In some examples, an end to end (E2E) connection may also be established between the terminals 11, for example, vehicle to vehicle (V2V) communication, vehicle to infrastructure (V2I) communication and vehicle to pedestrian (V2P) communication in vehicle to everything (V2X).

In some examples, the radio communication system above may further include a network management device 13.

Several base stations 12 are separately connected to the network management device 13. The network management device 13 may be a core network device in the radio communication system, for example, the network management device 13 may be a mobility management entity (MME) in an evolved packet core network (EPC). Alternatively, the network management device may be other core network devices, such as serving gateway (SGW), public data network gateway (PGW), a policy and charging rules function (PCRF) or a home subscriber server (HSS). An implementation form of the network management device 13 is not limited in the example of the disclosure.

Execution entities involved in the example of the disclosure include, but are not limited to, UE supporting cellular mobile communication such as a mobile terminal.

An application scenario of the example of the disclosure is as follows: a series of processes, such as discovery and authorization, are needed for measuring distances for the UE (such as the mobile terminal) and the communication device (such as the base station) that supports the cellular mobile communication, and such processes will consume plenty of time and signaling resources. It is an urgent problem to reduce signaling consumption and shorten distance measurement time in the distance measurement process.

Figure 2:
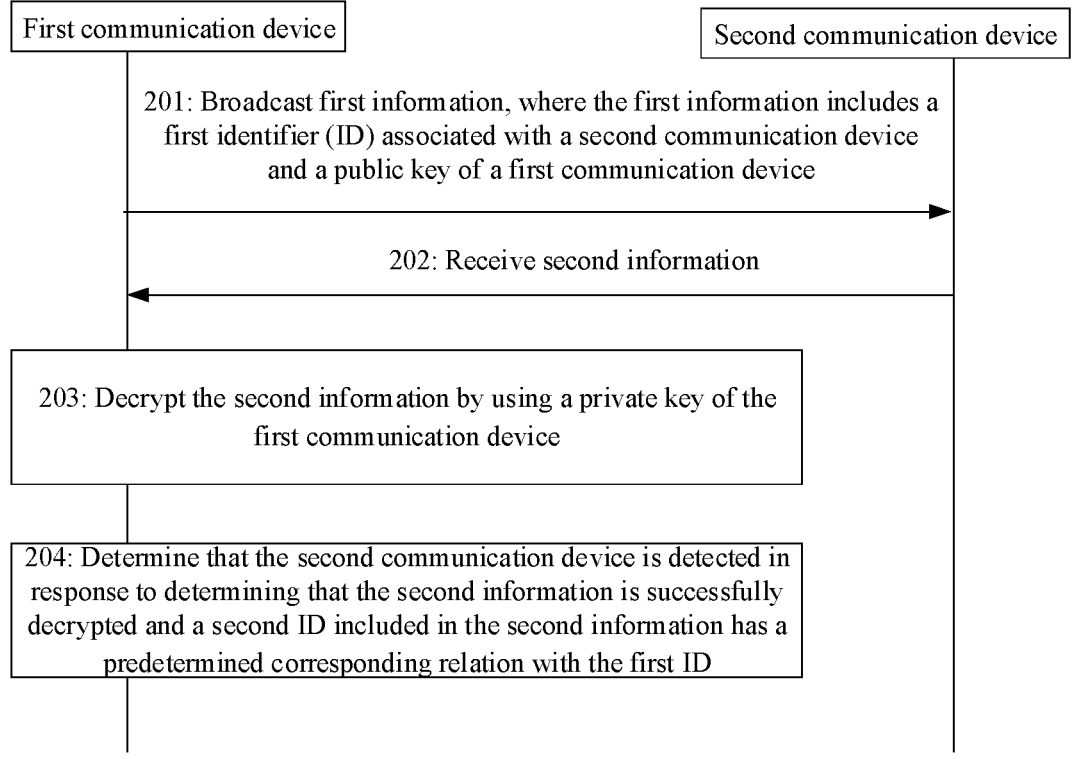
FIG. 2 is a schematic flowchart of a method for detecting a communication device according to an example.

As shown in FIG. 2, this example provides a method for detecting a communication device. The method for detecting a communication device may be applied to a first communication device, and includes steps 201-204.

Step 201: first information is broadcast from the first communication device to a second communication device. Where the first information includes a first identifier (ID) associated with the second communication device and a public key of the first communication device.

Step 202: second information is received by the first communication device.

Step 203: the second information is decrypted by using a private key of the first communication device.

Step 204: it is determined that the second communication device is detected in response to determining that the second information is successfully decrypted and a second ID included in the second information has a predetermined corresponding relation with the first ID.

The first communication device and the second communication device may be mobile terminals, etc. that use cellular mobile communication technology for radio communication.

The first communication device may directly transmit the first information through broadcast without establishing a communication connection with the second communication device. For example, the first communication device may broadcast the first information on a supportable frequency domain resource. The first communication device may further transmit the first information on a predetermined time-frequency resource. The frequency domain resource and/or time-frequency resource may be pre-configured or dynamically configured by a communication network.

The second communication device may receive the first information on the supportable frequency domain resource, and/or receive the first information on the predetermined time-frequency resource. For example, the second communication device may receive the first information through blind detection, etc.

After receiving the first information, the second communication device may compare a stored second ID with the first ID. The predetermined corresponding relation may be a unique corresponding relation. For example, the predetermined corresponding relation may be an equality relation. The first ID and the second ID may be the same or not, and each of the first ID and the second ID may have a unique association with the second communication device. For example, each of the first ID and the second ID may uniquely indicate the second communication device. For example, the first ID and the second ID may be the same, and may both be international mobile subscriber identities (IMSI) of the second communication device, etc. The first ID and/or the second ID may be pre-configured or dynamically configured by the application and 3rd generation partnership project (3GPP) network, or configured according to agreed rules.

If the second communication device determines that the second ID has the predetermined corresponding relation with the first ID, it may be determined that the first information is transmitted to the second communication device, and then the second information may be broadcast. The second information may carry the second ID.

In an example, the first ID is an identifier of the second communication device that is expected to be discovered and stored locally by the first communication device. The second ID is an identifier stored locally by the second communication device. The first ID and the second ID have a unique pairing relation, and successful pairing indicates that the first communication device passes identity authentication of the second communication device.

The second communication device may directly transmit the second information through broadcast without establishing a communication connection with the first communication device. For example, the second communication device may broadcast the second information on the supportable frequency domain resource, or the second communication device may transmit the second information on the predetermined time-frequency resource. The frequency domain resource and/or time-frequency resource may be pre-configured or dynamically configured by a communication network.

The first communication device may receive the second information on the supportable frequency domain resource, and/or receive the second information on the predetermined time-frequency resource. The first communication device may receive the second information through blind detection, etc.

The first communication device may determine that the second information is transmitted by the second communication device according to the second ID carried in the second information, and further determine that the second communication device is detected.

The public key of the first communication device may be carried in the first information and transmitted to the second communication device. The public key of the first communication device may at least be used by the second communication device for encrypting the second information transmitted to the first communication device, such that security of information between the first communication device and the second communication device is improved.

In this way, through broadcasting the first information by the first communication device, and the second information broadcast by the second communication device responding to the first ID in the first information, the first communication device detects the second communication device. The second communication device encrypts the second information by using the public key carried in the first information. Thus, security in the process of detecting the second communication device by the first communication device is improved.

In an example, integrity protection is performed on the first information by using the private key of the first communication device.

When the first communication device broadcasts the first information, an integrity signature may be formed with the private key of the first communication device and the first information through a predetermined algorithm.

After receiving the first information, the second communication device may decrypt the integrity signature with the public key of the first communication device, and compare a decryption result with the received first information. If a comparison result is consistent, it is determined that the first information is complete and not damaged during transmission. If a comparison result is inconsistent, it is determined that the first information is incomplete and damaged during transmission, and a subsequent step, such as transmitting the second information, is no more performed. In this way, the second communication device may determine integrity of the first information. Thus, transmission reliability of the first information is improved.

In an example, the first information further includes a first random number, and the first random number is encrypted by using the public key of the first communication device.

The step that it is determined that the second communication device is detected in response to determining that the second information is successfully decrypted and a second ID included in the second information has a predetermined corresponding relation with the first ID includes: it is determined that the second communication device is detected in response to determining that the second information is successfully decrypted, the second ID included in the second information has the predetermined corresponding relation with the first ID and the second information includes the first random number.

When transmitting the first information, the first communication device may carry the first random number that is encrypted by using the public key of the first communication device in the first information. The second communication device may decrypt the first random number by using the public key of the first communication device.

When transmitting the second information, the second communication device may carry the first random number that is encrypted by using the public key of the first communication device in the second information.

When receiving the second information, the first communication device may determine the first random number carried in the second information through decryption. The first random number encrypted may be used by the first communication device for determining whether the second information is replayed by the third party device. Since the third party device may not decrypt the first random number, the second information replayed may not carry the first random number that is encrypted by using the public key of the first communication device, and replay of the second information by the third party device may be identified and the second information may be discarded by the first communication device.

When the second information carries the first random number that is encrypted by using the public key of the first communication device, it means that the second information is transmitted by the second communication device and is not replayed. The first communication device may use information associated with the second information for subsequent processing. For example, the first communication device may determine whether the second communication device is detected based on the second ID in the second information. In this way, transmission security of the second information is improved.

In an example, the method further includes: the second information is discarded in response to determining that the first random number is not included in the second information.

When the second information does not carry the first random number that is encrypted by using the public key of the first communication device, it means that the second information is probably replayed by the third party device, resulting in a security risk. The second communication device may discard the second information. In this way, transmission security of the second information is improved.

In an example, the second information further carries a second random number.

The step that it is determined that the second communication device is detected in response to determining that the second information is successfully decrypted and a second ID included in the second information has a predetermined corresponding relation with the first ID includes: it is determined that the second communication device is detected in response to determining that the second information is successfully decrypted, the second ID included in the second information has the predetermined corresponding relation with the first ID and the second random number is obtained for the first time.

The second random number may be generated by the second communication device and carried in the second information and transmitted to the first communication device.

After receiving the second random number carried in the second information, the first communication device may compare the second random number with a plurality of historical random numbers in messages previously received. If the second random number is the same as the historical random number, it means that the second information is not received for the first time, and the second information may be discarded. If the second random number is different from all the historical random numbers, it means that the second information is received for the first time, and the first communication device may use the information associated with the second information for subsequent processing. For example, the first communication device may determine whether the second communication device is detected based on the second ID in the second information.

In this way, the first communication device may determine whether the second information received is a repeatedly transmitted message based on the second random number. Thus, the situation that repeated reception of the second information causes error processing is reduced.

In an example, the method further includes: the second information is discarded in response to determining that the second random number is not obtained for the first time.

If the second random number the same as the historical random number, it means that the second information is not received for the first time, and the first communication device may discard the second information. In this way, the first communication device may determine whether the second information received is a repeatedly transmitted message based on the second random number. Thus, the situation that repeated reception of the second information causes error processing is reduced.

In an example, the method further includes: a relative distance between the first communication device and the second communication device is determined based on time of flight of the first information and the second information, where the time of flight of the first information and the second information includes propagation duration of the first information and the second information in a medium.

The first communication device may record a time point when the first information is transmitted and a time point when the second information is received, such that total transmission duration of the first information and the second information may be determined. The second communication device may have a certain time delay from receiving the first information to broadcasting the second information. The first communication device may estimate the time delay, or the second communication device may transmit the second information after a time delay of constant duration. In this way, the first communication device may determine the time of flight of the first information and the second information based on the total transmission duration and the estimated time delay or the time delay of constant duration, and then determine the relative distance between the first communication device and the second communication device according to a propagation rate of an electromagnetic wave in a medium, such that the distance is measured.

In this way, the distance between the first communication device and the second communication device may be measured through at least two-time information transmission by the first communication device and the second communication device. Compared with the related art, distance measurement between the first communication device and the second communication device needs steps such as discovery, authentication, authorization and measurement, the method provided by this example greatly reduces signaling interaction, shortens time for distance measurement, and improves efficiency of distance measurement.

In an example, the method further includes: the time of flight of the first information and the second information is determined based on a first time interval and a second time interval, where the first time interval indicates a time interval from broadcasting the first information to receiving the second information by the first communication device, and the second time interval indicates a time interval from receiving the first information to broadcasting the second information by the second communication device.

Figure 3:
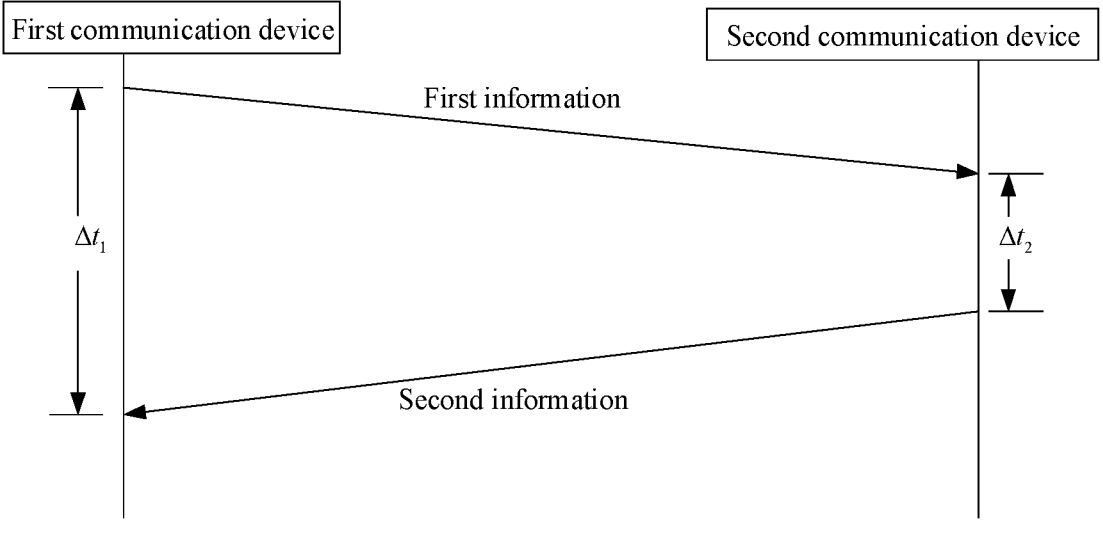
FIG. 3 is a schematic diagram of time of flight according to an example.

As shown in FIG. 3, the first communication device may record a time point when the first information is transmitted and a time point when the second information is received, such that total transmission duration for transmission and reception of the first information and the second information by the first communication device and the second communication device may be determined, that is, the first time interval $\Delta t_1$. The second communication device may have a certain response time delay from receiving the first information to broadcasting the second information, that is the second time interval $\Delta t_2$.

The first communication device may determine actual time of flight $\Delta t_1 - \Delta t_2$ of the first information and the second information based on the first time interval $\Delta t_1$ and the second time interval $\Delta t_2$.

Further, the first communication device may compute a relative distance S between the first communication device and the second communication device by using Expression (1).

$$S = (\Delta t_1 - \Delta t_2) \times c/2 \qquad (1)$$

In the above expression, c indicates a propagation speed of an electromagnetic wave in a propagation medium, for example, c may be a speed of light.

In an example, the second information includes first indication information, and the first indication information is configured to indicate the second time interval.

In response to the fact that the second communication device may determine the second time interval before the second information is transmitted, for example, the second communication device may estimate the second time interval before the second information is transmitted, or the second time interval is constant duration, etc. the second communication device may carry the first indication information indicating the second time interval in the second information and transmit same to the first communication device.

After receiving the second information, the first communication device may determine the second time interval, and then determine the relative distance between the first communication device and the second communication device.

In this way, the relative distance may be determined merely through two-time information transmission and reception under the condition that communication connection is not established between the first communication device and the second communication device. Thus, signaling transmission and reception is reduced, time for distance measurement is shortened, and efficiency of distance measurement is improved.

In an example, the method further includes: third information is received, where the third information includes second indication information, and the second indication information is configured to indicate the second time interval.

In response to the fact that the second communication device cannot determine the second time interval before the second information is transmitted, for example, the second communication device may merely determine the second time interval after the second information is transmitted, the second communication device may carry the second indication information indicating the second time interval in the third information and transmit same to the first communication device.

The second communication device may directly transmit the third information through broadcast without establishing a communication connection with the first communication device. For example, the second communication device may broadcast the third information on the supportable frequency domain resource and/or the second communication device may transmit the third information on the predetermined time-frequency resource. The predetermined frequency domain resource/time-frequency resource may be pre-configured or dynamically configured by a communication network.

The first communication device may monitor and receive the third information on the supportable frequency domain resource, and/or receive the third information on the predetermined time-frequency resource. The first communication device may receive the third information through blind detection, etc.

After receiving the third information, the first communication device may determine the second time interval, and then determine the relative distance between the first communication device and the second communication device.

In this way, the relative distance is determined under the condition that communication connection is not established between the first communication device and the second communication device. Thus, signaling transmission and reception caused by communication connection establishment, etc. is reduced, time for distance measurement is shortened, and efficiency of distance measurement is improved.

In an example, the third information is encrypted by using the public key of the first communication device.

The step that third information is received includes: the third information is received.

The third information is decrypted by using the private key of the first communication device.

In order to improve information security of the third information, the second communication device may encrypt the third information by using the public key of the first communication device when transmitting the third information.

After receiving the third information that is encrypted by using the public key of the first communication device, the first communication device may decrypt the third information by using the private key of the first communication device, then parse the third information and obtain the second time interval carried by the third information. In this way, the third information is encrypted, such that security of the third information during transmission can be improved.

In an example, the third information further includes a third random number.

The step that the time of flight of the first information and the second information is determined based on a first time interval and a second time interval includes: the time of flight is determined based on the first time interval and the second time interval in response to determining that the third random number is received for the first time.

The third random number may be generated by the second communication device and carried in the third information and transmitted to the first communication device.

After receiving the third random number carried in the third information, the first communication device may compare the third random number with a plurality of historical random numbers in messages previously received. If the third random number is the same as the historical random number, it means that the third information is not received for the first time and may be discarded. If the third random number is different from all the historical random numbers, it means that the third information is received for the first time. As a result, the time of flight may be determined based on the second time interval carried in the third information, and the relative distance between the first communication device and the second communication device is further determined.

In this way, the first communication device may determine whether the third information received is a repeatedly transmitted message based on the third random number.

In an example, the step that the time of flight of the first information and the second information is determined based on a first time interval and a second time interval includes: the time of flight is determined based on the first time interval and the second time interval in response to determining that the third information carries the second ID.

The third information may carry the second ID indicating the second communication device.

The first communication device may determine a transmission end of the third information based on a result of comparison between the second ID and the first ID that is stored in the first communication device. The first ID and the second ID may be configured to uniquely indicate the second communication device. The first ID and the second ID may have a unique corresponding relation, for example, the first ID may be equal to the second ID.

The first communication device may determine that the third information is transmitted by the second communication device based on the second ID, and the second time interval in the third information is a time interval corresponding to the second communication device. Thus, the time of flight of the first information and the second information between the first communication device and the second communication device may be determined.

In this way, when distances between the first communication device and a plurality of second communication devices are measured at the same time, third information transmitted by different second communication devices may be distinguished. Thus, a computation error of the second time interval caused by uncertainty of a transmission end of the second information is reduced, and accuracy of relative distance measurement is improved.

In an example, the first information further carries an application ID, and the application ID is configured to represent an application that needs the relative distance.

The application ID is configured to indicate an application requesting relative distance measurement. The second communication device may determine the application requesting relative distance measurement based on the application ID, and determine whether to perform distance measurement based on permission management of the application. If distance measurement of the application is allowed, the following steps are performed, such as transmitting the second information and the third information. If distance measurement of the application is not allowed, subsequent steps may not be performed. For example, the indication information of the second time interval may not be carried in the second information.

In an example, the first information further carries a command ID, and the command ID is configured to represent the first information.

The step that it is determined that the second communication device is detected in response to determining that the second information is successfully decrypted and a second ID included in the second information has a predetermined corresponding relation with the first ID includes: it is determined that the second communication device is detected in response to determining that the second information is successfully decrypted, the second ID included in the second information has the predetermined corresponding relation with the first ID and the second information includes the command ID.

The first information and the second information may establish an association through the command ID.

The first communication device carries the command ID in the first information. For the first information, the second communication device may carry the command ID in the second information. When receiving the second information, the first communication device may determine corresponding first information based on the command ID. During relative distance measurement, the first time interval, corresponding to the second time interval in the second information, in the first information may be determined.

Under the condition that the relative distances between the first communication device and a plurality of second communication devices are measured, second information corresponding to different kinds of first information may be distinguished, such that relative distance measurement errors caused by uncertainty of associated first information and second information can be reduced, and accuracy of relative distance measurement can be improved.

In an example, the step that the time of flight of the first information and the second information is determined based on a first time interval from broadcasting the first information to receiving the second information by the first communication device and a second time interval from receiving the first information to broadcasting the second information by the second communication device includes: in responding to the command ID carried in the third information, the time of flight of the first information and the second information is determined based on the first time interval and the second time interval.

When receiving the third information, the first communication device may determine first information corresponding to the third information based on the command ID. During relative distance measurement, the first time interval, corresponding to the second time interval in the third information, in the first information may be determined.

Under the condition that the relative distances between the first communication device and a plurality of second communication devices are measured, third information corresponding to different kinds of first information may be distinguished. Therefore, relative distance measurement errors caused by uncertainty of associated first information and third information can be reduced, and accuracy of relative distance measurement can be improved.

Figure 4:
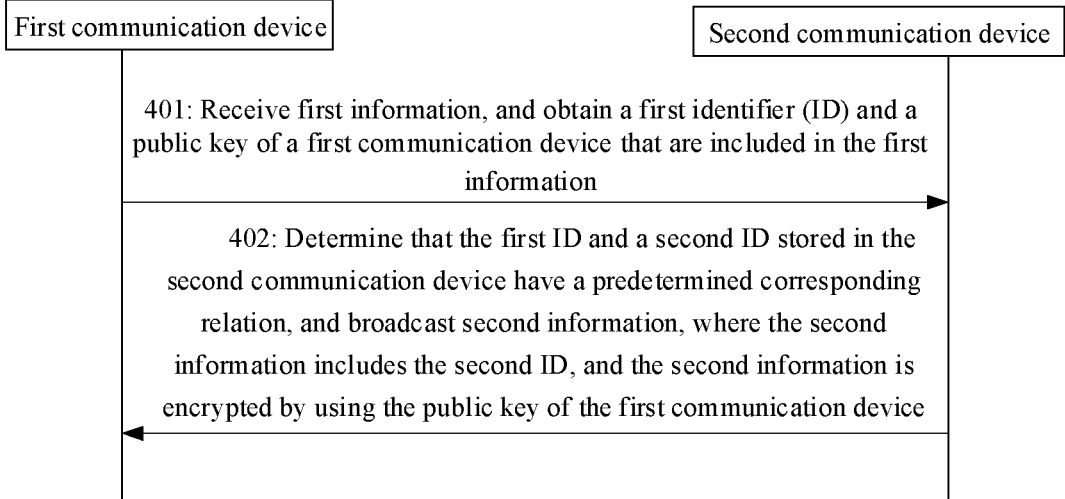
FIG. 4 is a schematic flowchart of another method for transmitting information according to an example.

As shown in FIG. 4, this example provides a method for detecting a communication device. The method for detecting a communication device may be applied to a second communication device, and includes steps 401 and 402.

Step 401: first information is received, and a first ID and a public key of a first communication device that are included in the first information are obtained by the second communication device.

Step 402: it is determined that the first ID and a second ID stored in the second communication device have a predetermined corresponding relation, and second information is broadcast to the first communication device. Where the second information includes the second ID, and the second information is encrypted by using the public key of the first communication device.

The first communication device and the second communication device may be mobile terminals, etc. that use cellular mobile communication technology for radio communication.

The first communication device may directly transmit the first information through broadcast without establishing a communication connection with the second communication device. For example, the first communication device may broadcast the first information on a supportable frequency domain resource. The first communication device may further transmit the first information on a predetermined time-frequency resource. The frequency domain resource and/or time-frequency resource may be pre-configured or dynamically configured by a communication network.

The second communication device may receive the first information on the supportable frequency domain resource, and/or receive the first information on the predetermined time-frequency resource. For example, the second communication device may receive the first information through blind detection, etc.

After receiving the first information, the second communication device may compare a stored second ID with the first ID. The predetermined corresponding relation may be a unique corresponding relation. For example, the predetermined corresponding relation may be an equality relation. The first ID and the second ID may be the same or not, and each of the first ID and the second ID may have a unique association with the second communication device. For example, each of the first ID and the second ID may uniquely indicate the second communication device. For example, the first ID and the second ID may be the same, and may both be international mobile subscriber identities (IMSI) of the second communication device, etc. The first ID and/or the second ID may be pre-configured or dynamically configured by the application and 3GPP network, or configured according to agreed rules.

If the second communication device determines that the second ID has the predetermined corresponding relation with the first ID, it may be determined that the first information is transmitted to the second communication device, and then the second information may be broadcast. The second information may carry the second ID.

In the example, the first ID is an identifier of the second communication device that is expected to be discovered and stored locally by the first communication device. The second ID is an identifier stored locally by the second communication device. The first ID and the second ID have a unique pairing relation, and successful pairing indicates that the first communication device passes identity authentication of the second communication device.

The second communication device may directly transmit the second information through broadcast without establishing a communication connection with the first communication device. For example, the second communication device may broadcast the second information on the supportable frequency domain resource, or the second communication device may transmit the second information on the predetermined time-frequency resource. The frequency domain resource and/or time-frequency resource may be pre-configured or dynamically configured by a communication network.

The first communication device may receive the second information on the supportable frequency domain resource, and/or receive the second information on the predetermined time-frequency resource. The first communication device may receive the second information through blind detection, etc.

The first communication device may determine that the second information is transmitted by the second communication device according to the second ID carried in the second information, and further determine that the second communication device is detected.

The public key of the first communication device may be carried in the first information and transmitted to the second communication device. The public key of the first communication device may at least be used by the second communication device for encrypting the second information transmitted to the first communication device. Thus, security of information between the first communication device and the second communication device is improved.

In this way, through broadcasting the first information by the first communication device, and the second information broadcast by the second communication device responding to the first ID in the first information, the first communication device detects the second communication device. The second communication device encrypts the second information by using the public key carried in the first information. Therefore, security in the process of detecting the second communication device by the first communication device is improved.

In an example, the method further includes: integrity verification is performed on the first information by using the public key of the first communication device.

When the first communication device broadcasts the first information, an integrity signature may be formed with the private key of the first communication device and the first information through a predetermined algorithm.

After receiving the first information, the second communication device may decrypt the integrity signature with the public key of the first communication device, and compare a decryption result with the received first information. If a comparison result is consistent, it is determined that the first information is complete and not damaged during transmission. If a comparison result is inconsistent, it is determined that the first information is incomplete and damaged during transmission, and a subsequent step, such as transmitting the second information, is no more performed. In this way, the second communication device may determine integrity of the first information, such that transmission reliability of the first information is improved.

In an example, the first information further includes a first random number, and the first random number is encrypted by using the public key of the first communication device. The second information includes the first random number that is encrypted by using the public key of the first communication device.

When transmitting the first information, the first communication device may carry the first random number that is encrypted by using the public key of the first communication device in the first information. The second communication device may decrypt the first random number by using the public key of the first communication device.

When transmitting the second information, the second communication device may carry the first random number that is encrypted by using the public key of the first communication device in the second information.

When receiving the second information, the first communication device may determine the first random number carried in the second information through decryption. The first random number encrypted may be used by the first communication device for determining whether the second information is replayed by the third party device. Since the third party device may not decrypt the first random number, the second information replayed may not carry the first random number that is encrypted by using the public key of the first communication device, and replay of the second information by the third party device may be identified and the second information may be discarded by the first communication device.

When the second information carries the first random number that is encrypted by using the public key of the first communication device, it means that the second information is transmitted by the second communication device and is not replayed. The first communication device may use information associated with the second information for subsequent processing. For example, the first communication device may determine whether the second communication device is detected based on the second ID in the second information.

In this way, transmission security of the second information is improved.

In an example, the method further includes: the first communication device and determines that the second information does not include the first random number that is encrypted by using the public key of the first communication device, and the first communication device discards the second information.

When the second information does not carry the first random number that is encrypted by using the public key of the first communication device, it means that the second information is probably replayed by the third party device, resulting in a security risk. The second communication device may discard the second information. In this way, transmission security of the second information is improved.

In an example, the second information further includes a second random number.

The second random number may be generated by the second communication device and carried in the second information and transmitted to the first communication device.

After receiving the second random number carried in the second information, the first communication device may compare the second random number with a plurality of historical random numbers in messages previously received. If the second random number is the same as the historical random number, it means that the second information is not received for the first time, and the second information may be discarded. If the second random number is different from all the historical random numbers, it means that the second information is received for the first time, and the first communication device may use the information associated with the second information for subsequent processing. For example, the first communication device may determine whether the second communication device is detected based on the second ID in the second information.

In this way, the first communication device may determine whether the second information received is a repeatedly transmitted message based on the second random number. Thus, the situation that repeated reception of the second information causes error processing is reduced.

In an example, the method further includes: the first communication device determines that the second random number is not obtained for the first time, and the first communication device discards the second information.

If the second random number is the same as the historical random number, it means that the second information is not received for the first time, and the first communication device may discard the second information.

In this way, the first communication device may determine whether the second information received is a repeatedly transmitted message based on the second random number. Therefore, the situation that repeated reception of the second information causes error processing is reduced.

In an example, the method further includes: the first communication device determines a relative distance between the first communication device and the second communication device based on time of flight of the first information and the second information.

The first communication device may record a time point when the first information is transmitted and a time point when the second information is received, such that total transmission duration of the first information and the second information may be determined. The second communication device may have a certain time delay from receiving the first information to broadcasting the second information. The first communication device may estimate the time delay, or the second communication device may transmit the second information after a time delay of constant duration. In this way, the first communication device may determine the time of flight of the first information and the second information based on the total transmission duration and the estimated time delay or the time delay of constant duration, and then determine the relative distance between the first communication device and the second communication device according to a propagation rate of an electromagnetic wave in a medium, such that the distance is measured.

In this way, the distance between the first communication device and the second communication device may be measured through at least two-time information transmission by the first communication device and the second communication device. Compared with the related art, distance measurement between the first communication device and the second communication device needs steps such as discovery, authentication, authorization and measurement, the method provided by this example greatly reduces signaling interaction, shortens time for distance measurement, and improves efficiency of distance measurement.

In an example, the method further includes: the first communication device determines the time of flight of the first information and the second information based on the first time interval from broadcasting the first information to receiving the second information by the first communication device and the second time interval from receiving the first information to broadcasting the second information by the second communication device.

Referring back to FIG. 3, the first communication device may record a time point when the first information is transmitted and a time point when the second information is received, such that total transmission duration for transmission and reception of the first information and the second information by the first communication device and the second communication device may be determined, that is, the first time interval $\Delta t_1$. The second communication device may have a certain response time delay from receiving the first information to broadcasting the second information, that is the second time interval $\Delta t_2$.

The first communication device may determine actual time of flight $\Delta t_1 - \Delta t_2$ of the first information and the second information based on the first time interval $\Delta t_1$ and the second time interval $\Delta t_2$.

Further, the first communication device may compute a relative distance S between the first communication device and the second communication device by using Expression (1), as recited previously. In Expression (1), c indicates a propagation speed of an electromagnetic wave in a propagation medium, for example, c may be a speed of light.

In an example, the second information further includes first indication information, the first indication information is configured to indicate a second time interval, and the second time interval indicates a time interval from receiving the first information to broadcasting the second information by the second communication device.

In response to the fact that the second communication device may determine the second time interval before the second information is transmitted, for example, the second communication device may estimate the second time interval before the second information is transmitted, or the second time interval is constant duration, etc. the second communication device may carry the first indication information indicating the second time interval in the second information and transmit same to the first communication device.

After receiving the second information, the first communication device may determine the second time interval, and then determine the relative distance between the first communication device and the second communication device.

In this way, the relative distance may be determined merely through two-time information transmission and reception under the condition that communication connection is not established between the first communication device and the second communication device, such that signaling transmission and reception is reduced, time for distance measurement is shortened and efficiency of distance measurement is improved.

In an example, the first information further carries an application ID.

The method further includes: it is determined whether to include the first indication information in the second information based on the application ID.

The application ID is configured to indicate an application requesting relative distance measurement. The second communication device may determine the application requesting relative distance measurement based on the application ID, and determine whether to perform distance measurement based on permission management of the application. If distance measurement of the application is allowed, the following steps are performed, such as transmitting the second information and the third information. If distance measurement of the application is not allowed, subsequent steps may not be performed. For example, the first indication information of the second time interval may not be carried in the second information.

In an example, the method further includes: third information is broadcast, where the third information carries second indication information, the second indication information is configured to indicate a second time interval, and the second time interval indicates a time interval from receiving the first information to broadcasting the second information by the second communication device.

In response to the fact that the second communication device cannot determine the second time interval before the second information is transmitted, for example, the second communication device may merely determine the second time interval after the second information is transmitted, the second communication device may carry the second indication information indicating the second time interval in the third information and transmit same to the first communication device.

The second communication device may directly transmit the third information through broadcast without establishing a communication connection with the first communication device. For example, the second communication device may broadcast the third information on the supportable frequency domain resource and/or the second communication device may transmit the third information on the predetermined time-frequency resource. The predetermined frequency domain resource/time-frequency resource may be pre-configured or dynamically configured by a communication network.

The first communication device may monitor and receive the third information on the supportable frequency domain resource, and/or receive the third information on the predetermined time-frequency resource. The first communication device may receive the third information through blind detection, etc.

After receiving the third information, the first communication device may determine the second time interval, and then determine the relative distance between the first communication device and the second communication device.

In this way, the relative distance is determined under the condition that communication connection is not established between the first communication device and the second communication device. Thus, signaling transmission and reception caused by communication connection establishment, etc. is reduced, time for distance measurement is shortened and efficiency of distance measurement is improved.

In an example, the third information is encrypted by using the public key of the first communication device. In order to improve information security of the third information, the second communication device may encrypt the third information by using the public key of the first communication device when transmitting the third information.

After receiving the third information that is encrypted by using the public key of the first communication device, the first communication device may decrypt the third information by using the private key of the first communication device, then parse the third information and obtain the second time interval carried by the third information. In this way, the third information is encrypted, such that security of the third information during transmission can be improved.

In an example, the third information further includes a third random number.

The third random number may be generated by the second communication device and carried in the third information and transmitted to the first communication device.

After receiving the third random number carried in the third information, the first communication device may compare the third random number with a plurality of historical random numbers in messages previously received. If the third random number is the same as the historical random number, it means that the third information is not received for the first time and may be discarded. If the third random number is different from all the historical random numbers, it means that the third information is received for the first time. As a result, the time of flight may be determined based on the second time interval carried in the third information, and the relative distance between the first communication device and the second communication device is further determined.

In this way, the first communication device may determine whether the third information received is a repeatedly transmitted message based on the third random number.

In an example, the third information further includes the second ID. The third information may carry the second ID indicating the second communication device.

The first communication device may determine a transmission end of the third information based on a result of comparison between the second ID and the first ID that is stored in the first communication device. The first ID and the second ID may be configured to uniquely indicate the second communication device. The first ID and the second ID may have a unique corresponding relation, for example, the first ID may be equal to the second ID.

The first communication device may determine that the third information is transmitted by the second communication device based on the second ID, and the second time interval in the third information is a time interval corresponding to the second communication device. Thus, the time of flight of the first information and the second information between the first communication device and the second communication device may be determined.

In this way, when distances between the first communication device and a plurality of second communication devices are measured at the same time, third information transmitted by different second communication devices may be distinguished. Therefore, a computation error of the second time interval caused by uncertainty of a transmission end of the second information is reduced, and accuracy of relative distance measurement is improved.

In an example, the first information further includes a command ID. The second information further includes the command ID. The first information and the second information may establish an association through the command ID.

The first communication device carries the command ID in the first information. For the first information, the second communication device may carry the command ID in the second information. When receiving the second information, the first communication device may determine corresponding first information based on the command ID. During relative distance measurement, the first time interval, corresponding to the second time interval in the second information, in the first information may be determined.

Under the condition that the relative distances between the first communication device and a plurality of second communication devices are measured, second information corresponding to different kinds of first information may be distinguished. Thus, relative distance measurement errors caused by uncertainty of associated first information and second information can be reduced, and accuracy of relative distance measurement can be improved.

In an example, the step that the third information is broadcast further includes: the third information carrying the command ID is broadcast.

When receiving the third information, the first communication device may determine third information corresponding to the third information based on the command ID. During relative distance measurement, the first time interval, corresponding to the second time interval in the third information, in the first information may be determined.

Under the condition that the relative distances between the first communication device and a plurality of second communication devices are measured, third information corresponding to different kinds of first information may be distinguished. Therefore, relative distance measurement errors caused by uncertainty of associated first information and third information can be reduced, and accuracy of relative distance measurement can be improved.

A specific instance is provided below in conjunction with any example above.

1. As shown in FIG. 3, the first communication device, that is, discovering UE transmits the first information. The first information is configured to discover other nearby UE involved in distance measurement, and then distance measurement is performed. The message includes an application ID that triggers the message, a first ID of the second communication device, that is, the discovered UE, a public key of the discovering UE, and a random number X generated by the discovering UE, where the random number X is encrypted by using the public key of the discovering UE. If needed, the first information may further include a command ID of the message. The integrity protection of the complete first information should be performed by using a private key of the discovering UE.

2. The discovered UE performs integrity verification on the first information by using the public key of the discovering UE, the first information that fails the verification is discarded, and the second information is transmitted based on the first information that passes verification.

2.1 If the discovered UE may determine $\Delta t_2$ before the second information is transmitted, the second information should include a second ID of the discovered UE, $\Delta t_2$, a random number Y generated by the discovered UE, and a random number X encrypted, and the command ID in 1 may be included if needed. The complete second information should be encrypted by using the public key of the discovering UE.

2.2 If the discovered UE may merely determine $\Delta t_2$ after the second information is transmitted, the second information should include a second ID of the discovered UE, a random number Y generated by the discovered UE, and a random number X encrypted, and the command ID may be included if needed. The complete second information should be encrypted by using the public key of the discovering UE, and then third information is transmitted.

3. The discovered UE transmits the third information, and the third information should include the second ID of the discovered UE, $\Delta t_2$, and a random number Z generated by the discovered UE, and the command ID may be included if needed. The complete third information should be encrypted by using that public key of the discovering UE.

4. The discovering UE obtains the second ID of the discovered UE by decrypting the message by using the private key, and determines that the second information and the third information are from the discovered UE through pairing check on a first ID locally stored and a second ID received. In addition, the discovering UE determines whether the first information is replayed by decrypting the random number X by using the private key. If the first information is replayed, the discovering UE discards all received messages. If the first information is not replayed, the discovering UE determines whether the second information and the third information are replayed by checking the random number Y or Z separately.

5. The discovering UE obtains $\Delta t_2$ by parsing the message by using the private key.

6. If the discovering UE obtains $\Delta t_1$ based on transmission time of the first information and arrival time of the second information, a distance between the discovering UE and the discovered UE may be expressed by Expression (1).

Figure 5:
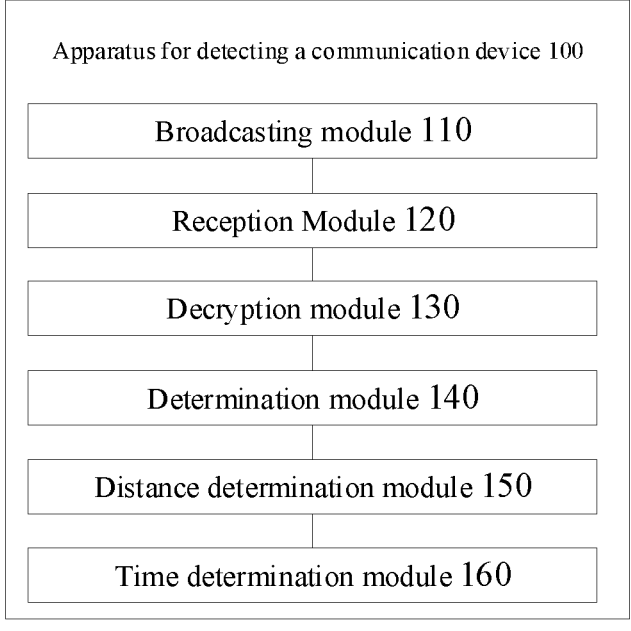
FIG. 5 is a block diagram of an apparatus for detecting a communication device according to an example.

The example of the disclosure further provides an apparatus for detecting a communication device applied to a first communication device. As shown in FIG. 5, the apparatus for detecting a communication device 100 includes a broadcasting module 110, a reception module 120, a decryption module 130, a determination module 140, a distance determination module 150, and a time determination module 160.

The broadcasting module 110 is configured to broadcast first information, where the first information includes a first identifier (ID) associated with a second communication device and a public key of a first communication device.

The reception module 120 is configured to receive second information.

The decryption module 130 is configured to decrypt the second information by using a private key of the first communication device.

The determination module 140 is configured to determine that the second communication device is detected in response to determining that the second information is successfully decrypted and a second ID included in the second information has a predetermined corresponding relation with the first ID.

In an example, integrity protection is performed on the first information by using the private key of the first communication device.

In an example, the first information further includes a first random number, and the first random number is encrypted by using the public key of the first communication device.

The determination module 140 is specifically configured to: determine that the second communication device is detected in response to determining that the second information is successfully decrypted, the second ID included in the second information has the predetermined corresponding relation with the first ID and the second information includes the first random number.

In an example, the reception module 120 is further configured to discard the second information in response to determining that the first random number is not included in the second information.

In an example, the second information further carries a second random number.

The determination module 140 is specifically configured to: determine that the second communication device is detected in response to determining that the second information is successfully decrypted, the second ID included in the second information has the predetermined corresponding relation with the first ID and the second random number is obtained for the first time.

In an example, the reception module 120 is further configured to discard the second information in response to determining that the second random number is not obtained for the first time.

The apparatus 100 further includes the distance determination module 150, which is configured to determine a relative distance between the first communication device and the second communication device based on time of flight of the first information and the second information. Where the time of flight of the first information and the second information includes propagation duration of the first information and the second information in a medium.

The apparatus 100 further includes the time determination module 160, which is configured to determine the time of flight of the first information and the second information based on a first time interval and a second time interval. Where the first time interval indicates a time interval from broadcasting the first information to receiving the second information by the first communication device, and the second time interval indicates a time interval from receiving the first information to broadcasting the second information by the second communication device.

In an example, the second information includes first indication information, and the first indication information is configured to indicate the second time interval.

In an example, the reception module 120 is further configured to receive third information, where the third information includes second indication information, and the second indication information is configured to indicate the second time interval.

In an example, the third information is encrypted by using the public key of the first communication device.

The reception module 120 is further configured to decrypt the third information by using the private key of the first communication device.

In an example, the third information further includes a third random number.

The time determination module 160 is specifically configured to determine the time of flight based on the first time interval and the second time interval in response to determining that the third random number is received for the first time.

In an example, the time determination module 160 is specifically configured to determine the time of flight based on the first time interval and the second time interval in response to determining that the third information carries the second ID.

In an example, the first information further carries an application ID, and the application ID is configured to represent an application that needs the relative distance.

In an example, the first information further carries a command ID, and the command ID is configured to represent the first information.

The determination module 140 is specifically configured to determine that the second communication device is detected in response to determining that the second information is successfully decrypted, the second ID included in the second information has the predetermined corresponding relation with the first ID and the second information includes the command ID.

Figure 6:
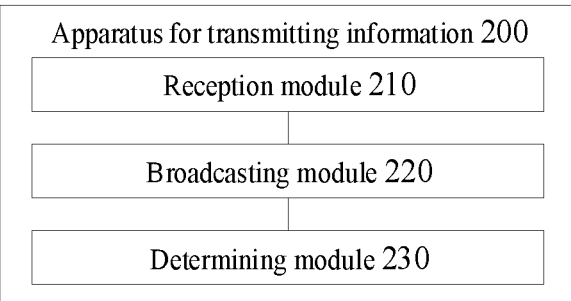
FIG. 6 is a block diagram of another apparatus for transmitting information according to an example.

The example of the disclosure further provides an apparatus for transmitting information 200 applied to a second communication device. As shown in FIG. 6, the apparatus 200 for transmitting information includes a reception module 210, a broadcasting module 220, and a determining module 230.

The reception module 210 is configured to receive first information, and obtain a first identifier (ID) and a public key of a first communication device that are included in the first information.

The broadcasting module 220 is configured to determine that the first ID and a second ID stored in the second communication device have a predetermined corresponding relation, and broadcast second information, where the second information includes the second ID, and the second information is encrypted by using the public key of the first communication device.

In an example, the reception module 210 is further configured to perform integrity verification on the first information by using the public key of the first communication device.

In an example, the first information includes a first random number, and the first random number is encrypted by using the public key of the first communication device.

The second information includes the first random number that is encrypted by using the public key of the first communication device.

In an example, the second information further includes a second random number.

In an example, the second information further includes first indication information, the first indication information is configured to indicate a second time interval, and the second time interval indicates a time interval from receiving the first information to broadcasting the second information by the second communication device.

In an example, the first information further carries an application ID.

The apparatus 200 further includes the determining module 230, which is configured to determine whether to include the first indication information in the second information based on the application ID.

In an example, the broadcasting module 220 is further configured to broadcast third information, where the third information carries second indication information, the second indication information is configured to indicate a second time interval, and the second time interval indicates a time interval from receiving the first information to broadcasting the second information by the second communication device.

In an example, the third information is encrypted by using the public key of the first communication device.

In an example, the third information further includes a third random number.

In an example, the third information further includes the second ID.

In an example, the first information further includes a command ID.

The second information further includes the command ID.

In an example, the broadcasting module 110, the reception module 120, the decryption module 130, the determination module 140, the distance determination module 150, the time determination module 160, the reception module 210, the broadcasting module 220, the determining module 230, etc. may be implemented by one or more central processing units (CPU), graphics processing units (GPU), baseband processors (BP), application specific integrated circuits (ASIC), digital signal processors (DSP), programmable logic devices (PLD), complex programmable logic devices (CPLD), field-programmable gate arrays (FPGA), general-purpose processors, controllers, micro controller units (MCU), microprocessors, or other electronic elements for executing the foregoing method.

Figure 7:
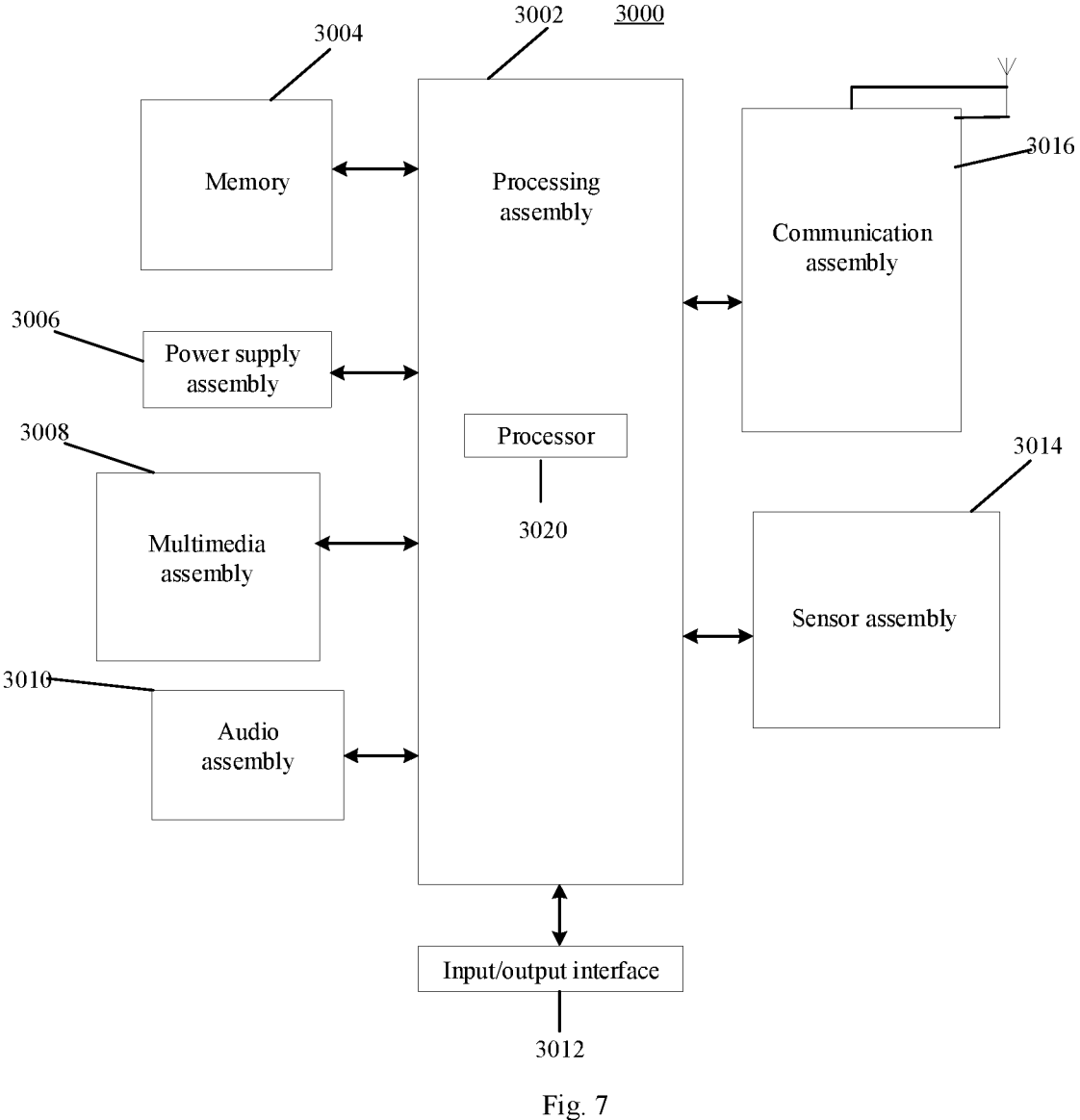
FIG. 7 is a block diagram of an apparatus for detecting a communication device or transmitting information according to an example.

FIG. 7 is a block diagram of an apparatus 3000 for detecting a communication device or transmitting information according to an example. For example, the apparatus 3000 may be a mobile phone, a computer, a digital broadcast terminal, a message transceiving device, a game console, a tablet device, a medical device, a fitness device, a personal digital assistant, etc.

With reference to FIG. 7, the apparatus 3000 may include one or more of a processing assembly 3002, a memory 3004, a power supply assembly 3006, a multimedia assembly 3008, an audio assembly 3010, an input/output (I/O) interface 3012, a sensor assembly 3014, and a communication assembly 3016.

Generally, the processing assembly 3002 controls an overall operation of the apparatus 3000, such as an operation associated with display, a telephone call, data communication, a camera operation, and a recording operation. The processing assembly 3002 may include one or more processors 3020 for executing an instruction, and completing all or some of the steps of the above method. In addition, the processing assembly 3002 may include one or more modules to facilitate interaction between the processing assembly 3002 and other assemblies. For example, the processing assembly 3002 may include a multimedia module to facilitate interaction between the multimedia assembly 3008 and the processing assembly 3002.

The memory 3004 is configured to store various types of data to support the operation of the apparatus 3000. Instances of such data include instructions for any application or method operated on the apparatus 3000, contact data, phonebook data, messages, pictures, videos, etc. The memory 3004 may be implemented by any kind of volatile or non-volatile storage devices or their combinations, such as a static random access memory (SRAM), an electrically erasable programmable read-only memory (EEPROM), an erasable programming read-only memory (EPROM), a programmable read-only memory (PROM), a read-only memory (ROM), a magnetic memory, a flash memory, a magnetic disk or an optical disk.

The power supply assembly 3006 energizes various assemblies of the apparatus 3000. The power supply assembly 3006 may include a power management system, one or more power supplies, and other assemblies associated with power generation, management, and distribution for the apparatus 3000.

The multimedia assembly 3008 includes a screen providing an output interface between the apparatus 3000 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, swipe, and gestures on the touch panel. The touch sensors may not merely sense a boundary of a touch or swipe action, but also detect time of duration and a pressure associated with the touch or swipe action. In some examples, the multimedia assembly 3008 includes a front-facing camera and/or a rear-facing camera. When the apparatus 3000 is in an operational mode, for example, a photographing mode or a video mode, the front-facing camera and/or the rear-facing camera may receive external multimedia data. Each of the front-facing camera and the rear-facing camera may be a constant optical lens system or have a variable focal length and optical zoom capacity.

The audio assembly 3010 is configured to output and/or input an audio signal. For example, the audio assembly 3010 includes a microphone (MIC). The microphone is configured to receive an external audio signal when the apparatus 3000 is in an operation mode such as a call mode, a recording mode or a speech identification mode. The received audio signals may be further stored in the memory 3004 or transmitted via the communication assembly 3016. In some examples, the audio assembly 3010 further includes a speaker for outputting audio signals.

The I/O interface 3012 provides an interface between the processing assembly 3002 and a peripheral interface module that may be a keyboard, a click wheel, a button, etc. These buttons may include, but are not limited to, a home button, a volume button, a start button, and a lock button.

The sensor assembly 3014 includes one or more sensors for providing state assessments in various aspects for the apparatus 3000. For example, the sensor assembly 3014 may detect an on/off state of the apparatus 3000, and relative positioning of assemblies, for example, the assemblies are a display and a keypad of the apparatus 3000. The sensor assembly 3014 may also detect a change in position of the apparatus 3000 or an assembly of the apparatus 3000, presence or absence of contact between the user and the apparatus 3000, orientation or acceleration/deceleration of the apparatus 3000, and temperature change of the apparatus 3000. The sensor assembly 3014 may include a proximity sensor configured to detect presence of a nearby object without any physical contact. The sensor assembly 3014 may further include an optical sensor, such as a complementary metal-oxide-semiconductor transistor (CMOS) or charge-coupled device (CCD) image sensor, for use in imaging applications. In some examples, the sensor assembly 3014 may further include an acceleration sensor, a gyroscope sensor, a magnetic sensor, a pressure sensor, or a temperature sensor.

The communication assembly 3016 is configured to facilitate wired or wireless communication between the apparatus 3000 and other devices. The apparatus 3000 may access a wireless network based on a communication standard, such as WiFi, 2G or 3G, or their combinations. In an example, the communication assembly 3016 receives a broadcast signal or broadcast related information from an external broadcast management system via a broadcast channel. In an example, the communication assembly 3016 further includes a near field communication (NFC) module to promote short-range communications. For example, the NFC module may be implemented based on a radio frequency identification (RFID) technology, an infrared data association (IrDA) technology, an ultra-wide band (UWB) technology, a Bluetooth (BT) technology, etc.

In an example, the apparatus 3000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components for executing the method.

In an example, a non-transitory computer-readable storage medium including an instruction is further provided, such as the memory 3004 including an instruction. The above instruction may be executed by the processor 3020 of the apparatus 3000 for implementing the method. For example, the non-transitory computer-readable storage medium may be a ROM, a random access memory (RAM), a CD-ROM, a magnetic tape, a floppy disc, an optical data storage device, etc.

According to a first aspect of the example of the disclosure, a method for detecting a communication device is provided. The method is executed by a first communication device, and includes: broadcasting first information, where the first information includes a first identifier (ID) associated with a second communication device and a public key of the first communication device;

receiving second information; decrypting the second information by using a private key of the first communication device; and determining that the second communication device is detected in response to determining that the second information is successfully decrypted and a second ID included in the second information has a predetermined corresponding relation with the first ID.

In an example, integrity protection is performed on the first information by using the private key of the first communication device.

In an example, the first information further includes a first random number, and the first random number is encrypted by using the public key of the first communication device; and the determining that the second communication device is detected in response to determining that the second information is successfully decrypted and a second ID included in the second information has a predetermined corresponding relation with the first ID includes: determining that the second communication device is detected in response to determining that the second information is successfully decrypted, the second ID included in the second information has the predetermined corresponding relation with the first ID and the second information includes the first random number.

In an example, the method further includes: discarding second information in response to determining that the first random number is not included in the second information.

In an example, the second information further carries a second random number; and the determining that the second communication device is detected in response to determining that the second information is successfully decrypted and a second ID included in the second information has a predetermined corresponding relation with the first ID includes: determining that the second communication device is detected in response to determining that the second information is successfully decrypted, the second ID included in the second information has the predetermined corresponding relation with the first ID and the second random number is obtained for the first time.

In an example, the method further includes: discarding the second information in response to determining that the second random number is not obtained for the first time.

In an example, the method further includes: determining a relative distance between the first communication device and the second communication device based on time of flight of the first information and the second information, where the time of flight of the first information and the second information includes propagation duration of the first information and the second information in a medium.

In an example, the method further includes: determining the time of flight of the first information and the second information based on a first time interval and a second time interval, where the first time interval indicates a time interval from broadcasting the first information to receiving the second information by the first communication device, and the second time interval indicates a time interval from receiving the first information to broadcasting the second information by the second communication device.

In an example, the second information includes first indication information, and the first indication information is configured to indicate the second time interval.

In an example, the method further includes: receiving third information, where the third information includes second indication information, and the second indication information is configured to indicate the second time interval.

In an example, the third information is encrypted by using the public key of the first communication device; and the receiving third information includes: receiving the third information; and decrypting the third information by using the private key of the first communication device.

In an example, the third information further includes a third random number; and the determining the time of flight of the first information and the second information based on a first time interval and a second time interval includes: determining the time of flight based on the first time interval and the second time interval in response to determining that the third random number is received for the first time.

In an example, the determining the time of flight of the first information and the second information based on a first time interval and a second time interval includes: determining the time of flight based on the first time interval and the second time interval in response to determining that the third information carries the second ID.

In an example, the first information further carries an application ID, and the application ID is configured to represent an application that needs the relative distance.

In an example, the first information further carries a command ID, and the command ID is configured to represent the first information; and the determining that the second communication device is detected in response to determining that the second information is successfully decrypted and a second ID included in the second information has a predetermined corresponding relation with the first ID includes: determining that the second communication device is detected in response to determining that the second information is successfully decrypted, the second ID included in the second information has the predetermined corresponding relation with the first ID and the second information includes the command ID.

According to a second aspect of the example of the disclosure, a method for transmitting information is provided. The method is executed by a second communication device, and includes:

receiving first information, and obtaining a first identifier (ID) and a public key of a first communication device that are included in the first information; and determining that the first ID and a second ID stored in the second communication device have a predetermined corresponding relation, and broadcasting second information, where the second information includes the second ID, and the second information is encrypted by using the public key of the first communication device.

In an example, the method further includes: performing integrity verification on the first information by using the public key of the first communication device.

In an example, the first information further includes a first random number, and the first random number is encrypted by using the public key of the first communication device; and the second information includes the first random number that is encrypted by using the public key of the first communication device.

In an example, the second information further includes a second random number.

In an example, the second information further includes first indication information, the first indication information is configured to indicate a second time interval, and the second time interval indicates a time interval from receiving the first information to broadcasting the second information by the second communication device.

In an example, the first information further carries an application ID; and the method further includes: determining whether to include the first indication information in the second information based on the application ID.

In an example, the method further includes: broadcasting third information, where the third information carries second indication information, the second indication information is configured to indicate a second time interval, and the second time interval indicates a time interval from receiving the first information to broadcasting the second information by the second communication device.

In an example, the third information is encrypted by using the public key of the first communication device.

In an example, the third information further includes a third random number.

In an example, the third information further includes the second ID.

In an example, the first information further includes a command ID; and the second information further includes the command ID.

According to a third aspect of the example of the disclosure, an apparatus for detecting a communication device is provided. The apparatus includes: a broadcasting module, configured to broadcast first information, where the first information includes a first identifier (ID) associated with a second communication device and a public key of a first communication device; a reception module, configured to receive second information; a decryption module, configured to decrypt the second information by using a private key of the first communication device; and a determination module, configured to determine that the second communication device is detected in response to determining that the second information is successfully decrypted and a second ID included in the second information has a predetermined corresponding relation with the first ID.

In an example, integrity protection is performed on the first information by using the private key of the first communication device.

In an example, the first information further includes a first random number, and the first random number is encrypted by using the public key of the first communication device; and the determination module is specifically configured to: determine that the second communication device is detected in response to determining that the second information is successfully decrypted, the second ID included in the second information has the predetermined corresponding relation with the first ID and the second information includes the first random number.

In an example, the reception module is further configured to discard the second information in response to determining that the first random number is not included in the second information.

In an example, the second information further carries a second random number; and the determination module is specifically configured to: determine that the second communication device is detected in response to determining that the second information is successfully decrypted, the second ID included in the second information has the predetermined corresponding relation with the first ID and the second random number is obtained for the first time.

In an example, the reception module is further configured to discard the second information in response to determining that the second random number is not obtained for the first time.

In an example, the apparatus further includes: a distance determination module, configured to determine a relative distance between the first communication device and the second communication device based on time of flight of the first information and the second information, where the time of flight of the first information and the second information includes propagation duration of the first information and the second information in a medium.

In an example, the apparatus further includes: a time determination module, configured to determine the time of flight of the first information and the second information based on a first time interval and a second time interval, where the first time interval indicates a time interval from broadcasting the first information to receiving the second information by the first communication device, and the second time interval indicates a time interval from receiving the first information to broadcasting the second information by the second communication device.

In an example, the second information includes first indication information, and the first indication information is configured to indicate the second time interval.

In an example, the reception module is further configured to receive third information, where the third information includes second indication information, and the second indication information is configured to indicate the second time interval.

In an example, the third information is encrypted by using the public key of the first communication device; and the reception module is further configured to decrypt the third information by using the private key of the first communication device.

In an example, the third information further includes a third random number; and the time determination module is specifically configured to determine the time of flight based on the first time interval and the second time interval in response to determining that the third random number is received for the first time.

In an example, the time determination module is specifically configured to determine the time of flight based on the first time interval and the second time interval in response to determining that the third information carries the second ID.

In an example, the first information further carries an application ID, and the application ID is configured to represent an application that needs the relative distance.

In an example, the first information further carries a command ID, and the command ID is configured to represent the first information; and the determination module is specifically configured to determine that the second communication device is detected in response to determining that the second information is successfully decrypted, the second ID included in the second information has the predetermined corresponding relation with the first ID and the second information includes the command ID.

According to a fourth aspect of the example of the disclosure, an apparatus for transmitting information is provided. The apparatus includes: a reception module, configured to receive first information, and obtain a first identifier (ID) and a public key of a first communication device that are included in the first information; and a broadcasting module, configured to determine that the first ID and a second ID stored in the second communication device have a predetermined corresponding relation, and broadcast second information, where the second information includes the second ID, and the second information is encrypted by using the public key of the first communication device.

In an example, the reception module is further configured to perform integrity verification on the first information by using the public key of the first communication device.

In an example, the first information includes a first random number, and the first random number is encrypted by using the public key of the first communication device; and the second information includes the first random number that is encrypted by using the public key of the first communication device.

In an example, the second information further includes a second random number.

In an example, the second information further includes first indication information, the first indication information is configured to indicate a second time interval, and the second time interval indicates a time interval from receiving the first information to broadcasting the second information by the second communication device.

In an example, the first information further carries an application ID; and the apparatus further includes: a determining module, configured to determine whether to include the first indication information in the second information based on the application ID.

In an example, the broadcasting module is further configured to broadcast third information, where the third information carries second indication information, the second indication information is configured to indicate a second time interval, and the second time interval indicates a time interval from receiving the first information to broadcasting the second information by the second communication device.

In an example, the third information is encrypted by using the public key of the first communication device.

In an example, the third information further includes a third random number.

In an example, the third information further includes the second ID.

In an example, the first information further includes a command ID; and the second information further includes the command ID.

According to a fifth aspect of the example of the disclosure, a communication device apparatus is provided. The apparatus includes a processor, a memory, and an executable program that is stored in the memory and runnable by the processor, where the processor executes steps of the method for detecting a communication device in the first aspect or steps of the method for transmitting information in the second aspect when running the executable program.

According to a sixth aspect of the example of the disclosure, a non-transitory computer-readable storage medium is provided. The computer-readable storage medium stores an instruction, where the instruction implements the method in the first aspect or the second aspect when executed.

The examples of the disclosure provide the method and apparatus for detecting a communication device, the communication device, and the storage medium. The first communication device broadcasts the first information, where the first information includes the first identifier (ID) associated with the second communication device and the public key of the first communication device; the second information is received; the second information is decrypted by using the private key of the first communication device; and it is determined that the second communication device is detected in response to determining that the second information is successfully decrypted, and the second ID included in the second information has the predetermined corresponding relation with the first ID. In this way, the first communication device broadcasts the first information, and the second communication device responds to the second information broadcast by the first ID in the first information, such that the first communication device detects the second communication device. The second communication device encrypts the second information by using the public key carried in the first information, such that security in the process of detecting the second communication device by the first communication device is improved.

Those skilled in the art could easily conceive of other implementation solutions of the examples of the disclosure upon consideration of the description and implementation of the invention disclosed here. The disclosure is intended to cover any variation, use or adaptive change of the example of the disclosure, which follows general principles of the example of the disclosure and includes common general knowledge or conventional technical means in the technical field that is not disclosed in example of the disclosure. The description and the example are merely considered illustrative, and a true scope and spirit of the example of the disclosure are indicated by the following claims.

It should be understood that the examples of the disclosure are not limited to precise structures described above and shown in the accompanying drawings, and various modifications and changes can be made without departing from the scope of the example. The scope of the example of the disclosure is merely limited by the appended claims.

The invention claimed is:

1. A method for detecting a communication device, executed by a first communication device, and comprising:

broadcasting first information, wherein the first information comprises a first identifier (ID) associated with a second communication device and a public key of the first communication device;

receiving second information;

decrypting the second information by using a private key of the first communication device; and determining that the second communication device is detected in response to determining that the second information is successfully decrypted and a second ID comprised in the second information has a predetermined corresponding relation with the first ID;

wherein the second information further comprises a second random number; and determining that the second communication device is detected in response to determining that the second information is successfully decrypted and the second ID has the predetermined corresponding relation with the first ID comprises:

determining that the second communication device is detected in response to determining that the second information is successfully decrypted, the second ID has the predetermined corresponding relation with the first ID and the second random number is obtained for a first time.

2. The method according to claim 1, wherein integrity protection is performed on the first information by using the private key of the first communication device.

3. The method according to claim 1, wherein the first information further comprises a first random number, and the first random number is encrypted by using the public key of the first communication device; and determining that the second communication device is detected in response to determining that the second information is successfully decrypted and the second ID has the predetermined corresponding relation with the first ID comprises:

determining that the second communication device is detected in response to determining that the second information is successfully decrypted, the second ID has the predetermined corresponding relation with the first ID and the second information comprises the first random number.

4. The method according to claim 1, further comprising:

determining a relative distance between the first communication device and the second communication device based on a time of flight of the first information and the second information, wherein the time of flight of the first information and the second information comprises propagation duration of the first information and the second information in a medium.

5. The method according to claim 4, further comprising:

determining the time of flight of the first information and the second information based on a first time interval and a second time interval, wherein the first time interval indicates a time interval from broadcasting the first information to receiving the second information by the first communication device, and the second time interval indicates a time interval from receiving the first information to broadcasting the second information by the second communication device.

6. The method according to claim 5, wherein the second information comprises first indication information, and the first indication information is configured to indicate the second time interval.

7. The method according to claim 5, further comprising:

receiving third information, wherein the third information comprises second indication information, and the second indication information is configured to indicate the second time interval.

8. The method according to claim 7, wherein the third information is encrypted by using the public key of the first communication device; and the receiving third information comprises:

receiving the third information; and decrypting the third information by using the private key of the first communication device.

9. The method according to claim 4, wherein the first information further comprises an application ID, and the application ID is configured to represent an application that needs the relative distance.

10. The method according to claim 1, wherein the first information further comprises a command ID, and the command ID is configured to represent the first information; and determining that the second communication device is detected in response to determining that the second information is successfully decrypted and the second ID has the predetermined corresponding relation with the first ID comprises: determining that the second communication device is detected in response to determining that the second information is successfully decrypted, the second ID has the predetermined corresponding relation with the first ID and the second information comprises the command ID.

11. A non-transitory computer-readable storage medium, storing an instruction, wherein when executed by a processor, the instruction causes the processor to implements the method according to claim 1.

12. A method for transmitting information, executed by a second communication device, and comprising:

receiving first information, and obtaining a first identifier (ID) and a public key of a first communication device that are comprised in the first information; and determining that the first ID and a second ID stored in the second communication device have a predetermined corresponding relation, and broadcasting second information, wherein the second information comprises the second ID, and the second information is encrypted by using the public key of the first communication device, wherein the second information further comprises a second random number; and determining that the second communication device is detected in response to determining that the second information is successfully decrypted and the second ID has the predetermined corresponding relation with the first ID comprises:

determining that the second communication device is detected in response to determining that the second information is successfully decrypted, the second ID has the predetermined corresponding relation with the first ID and the second random number is obtained for a first time.

13. The method according to claim 12, further comprising:

performing integrity verification on the first information by using the public key of the first communication device.

14. The method according to claim 12, wherein the second information further comprises first indication information, the first indication information is configured to indicate a second time interval, and the second time interval indicates a time interval from receiving the first information to broadcasting the second information by the second communication device.

15. The method according to claim 14, wherein the first information further comprises an application ID; and the method further comprises: determining whether to comprise the first indication information in the second information based on the application ID.

16. The method according to claim 12, further comprising:

broadcasting third information, wherein the third information comprises second indication information, the second indication information is configured to indicate a second time interval, and the second time interval indicates a time interval from receiving the first information to broadcasting the second information by the second communication device.

17. A communication device apparatus, comprising a processor, a memory, and an executable program that is stored in the memory and runnable by the processor, wherein the processor executes steps of the method for detecting a communication device according to claim 12 when running the executable program.

18. A non-transitory computer-readable storage medium, storing an instruction, wherein when executed by a processor, the instruction causes the processor to implement the method according to claim 12.

19. A communication device apparatus, comprising a processor, a memory, and an executable program that is stored in the memory and runnable by the processor, wherein the processor is configured to:

broadcast first information, wherein the first information comprises a first identifier (ID) associated with a second communication device and a public key of the first communication device;

receive second information;

decrypt the second information by using a private key of the first communication device; and determine that the second communication device is detected in response to determining that the second information is successfully decrypted and a second ID comprised in the second information has a predetermined corresponding relation with the first ID;

wherein the second information further comprises a second random number, and the processor is further configured to:

determine that the second communication device is detected in response to determining that the second information is successfully decrypted, the second ID has the predetermined corresponding relation with the first ID and the second random number is obtained for a first time.

\* \* \* \* \*